United States Patent [19]

Amann et al.

[11] 4,225,703

[45] Sep. 30, 1980

[54] PROCESS FOR THE PRODUCTION OF OXYMETHYLENE COPOLYMER MOLDING COMPOSITIONS WITH A LOW CONTENT OF RESIDUAL FORMALDEHYDE

[75] Inventors: Herbert Amann; Gerhard Morlock, both of Hanau; Hellmut Trautwein, Hasselroth, all of Fed. Rep. of Germany

[73] Assignee: Deutsche Gold- und Silber-Scheideanstalt vormals Roessler, Frankfurt, Fed. Rep. of Germany

[21] Appl. No.: 74,766

[22] Filed: Sep. 11, 1979

[30] Foreign Application Priority Data

Sep. 19, 1978 [DE] Fed. Rep. of Germany ....... 2840679

[51] Int. Cl.$^3$ .............................................. C08G 2/28
[52] U.S. Cl. .............................. 528/480; 260/45.9 P; 260/45.95 R; 525/398; 525/410; 528/230; 528/492; 528/495
[58] Field of Search ............... 528/230, 480, 492, 495; 525/398, 410; 260/45.9 P, 45.95

[56] References Cited

U.S. PATENT DOCUMENTS

| | | | |
|---|---|---|---|
| 3,960,984 | 6/1976 | Kohan | 525/400 |
| 4,139,575 | 2/1979 | Amann et al. | 525/414 |

FOREIGN PATENT DOCUMENTS

| | | |
|---|---|---|
| 1420283 | 11/1969 | Fed. Rep. of Germany . |
| 1445273 | 1/1970 | Fed. Rep. of Germany . |
| 1929928 | 1/1970 | Fed. Rep. of Germany . |
| 1720271 | 9/1971 | Fed. Rep. of Germany . |
| 2011493 | 2/1972 | Fed. Rep. of Germany . |
| 1794387 | 10/1973 | Fed. Rep. of Germany . |
| 2436384 | 2/1976 | Fed. Rep. of Germany . |
| 2540207 | 11/1976 | Fed. Rep. of Germany . |

*Primary Examiner*—Lucille M. Phynes
*Attorney, Agent, or Firm*—Cushman, Darby & Cushman

[57] ABSTRACT

Oxymethylene copolymers molding compositions with low portions of residual formaldehyde are produced by heating the polymerizate melts treated with chemical stabilizers in an apparatus in which there are continuously presented new polymerizate surfaces under reduced pressure. The heating of the polymerizate melt takes place in a thin layer evaporator for highly viscous media during an average residence time of 30 to 120 seconds at an average rate of shear between 500 and 2000 s$^{-1}$ and at a pressure $P_{abs}$ of at most 150 mbar. The escaping gases and vapors are drawn off countercurrent to the polymerizate melt.

5 Claims, No Drawings

PROCESS FOR THE PRODUCTION OF OXYMETHYLENE COPOLYMER MOLDING COMPOSITIONS WITH A LOW CONTENT OF RESIDUAL FORMALDEHYDE

BACKGROUND OF THE INVENTION

The invention is directed to a process for the production of oxymethylene copolymers-molding compositions with a low content of residual formaldehyde by heating the polymerizate melt treated with chemical stabilizers in an apparatus in which new polymerizate surfaces are continuously presented under reduced pressure.

Oxymethylene copolymerizates are produced on a large commercial scale by cationic copolymerization of trioxane with suitable comonomers. The crude copolymerizate still contains unreacted monomers, residues of the catalyst used and thermally unstable portions. They therefore still need a special working up in order to be used and processed as thermoplastic molding compositions in customary manner.

It is already known to carry out the working up, particularly the removal of the thermally unstable portion in such manner that the polymerizate melt treated with chemical stabilizers is heated under reduced pressure in an apparatus in which there are continuously presented new polymerizate-surfaces (German AS No. 1,445,273, (the entire disclosure of which is hereby incorporated by reference and relied upon). As suitable apparatus there are mentioned roller mixing mills and extruders. In the course of time the known processes on the other hand were still further improved by carrying out the processing in special degassing extruders. The molding compositions worked up according to the known processes contain a relatively high portion of residual formaldehyde which frequently is the cause of odor problems in the further processing of deposits on the walls of the injection molds and in producing molded articles with faults.

Therefore, there was also already known a process by which the odor forming residual formaldehyde is removed from the polyoxymethylene-molding composition in granulate form in a special subsequent treating step (Doerfel, German AS No. 2,435,384). This additional treatment, however, is quite expensive and particularly requires a relatively long treatment time.

SUMMARY OF THE INVENTION

According to the invention there is provided a process for the production of oxymethylene copolymerizate-molding compositions with a low content of residual formaldehyde by heating under reduced pressure the polymerizate-melt treated with chemical stabilizers in an apparatus in which there are continuously presented new polymerizate surfaces, in which the heating of the polymerizate melt takes place in a thin layer evaporator for highly viscous media during an average residence time of 30 to 120 seconds at a rate of shear between 500 and 2000s$^{-1}$ and at a pressure of P$_{abs}$ of at most 150 mbar and while the escaping gases and vapors are drawn off countercurrent to the polymerizate melt.

The polymerizate melt is preferably heated to a temperature between 180° and 280° C., especially between 190° and 260° C.

Through the process of the invention there are obtained directly molding compositions which only contain a very small portion of residual formaldehyde.

The oxymethylene copolymerizates employed are copolymerizates of trioxane and at least one compound copolymerizable with trioxane.

Such compounds copolymerizable with trioxane are, for example, cyclic ethers having 3 to 5, preferably 3 ring members; cyclic acetals, especially formals having 5 to 11, preferably 5 to 8 ring members and linear or branched polyacetals, especially polyformals. The above mentioned co-components are employed in quantities of about 0.01 to about 20, preferably about 0.5 to about 10, especially about 1.5 to about 5 mole percent in the final copolymerizate. In using polyacetals as co-components these concentration statements are based on the monomerunits of the polyacetals.

Particularly suitable as comonomers are compounds of the formula:

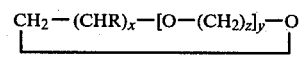

in which R signifies a hydrogen atom, an alkyl radical having 1 to 6, preferably 1, 2 or 3 carbon atoms, which can be substituted by 1, 2 or 3 halogen atoms, preferably chlorine atoms; an alkoxymethyl radical having 2 to 6, preferably 2, 3 or 4 carbon atoms; a phenyl radical or a phenoxymethyl radical; x is a whole number from 1 to 3, when y=0; y is a whole number from 1 to 3, when x=0 and z=2; z is a whole number from 3 to 6, preferably 3 or 4, when x=0 and y=1.

Epoxides, for example, ethylene oxide, styrene oxide, propylene oxide and epichlorohydrin, as well as glycidyl ethers of mono- or multivalent alcohols or phenols are suitable above all as cyclic ethers. Examples of the glycidyl ethers include glycidyl butyl ether, glycidyl phenyl ether, diglycidyl ether of ethylene glycol, diglycidyl ether of diethylenglycol diglycidyl ether of resorcinol, diglycidyl ether of bisphenol A.

Suitable above all as cyclic acetals are cyclic formals of aliphatic or cycloaliphatic α,ω-diols having 2 to 8, preferably 2, 3 or 4 carbon atoms, the carbon chain of which can be interrupted at intervals of 2 carbon atoms by an oxygen atom, for example, glycol formal (1,3-dioxolane), propanediol formal (1,3-dioxane), butanediol formal (1,3-dioxepane) and diglycol formal (1.3,6-trioxocane), as well as 4-chloromethyl-1,3-dioxolane, hexanediol formal (1,3-dioxonane) and butenediol formal [1,3-dioxacycloheptene-(5)]. However, diformals, for example diglycerin diformal, are also suitable, especially for the production of terpolymers of trioxane.

As linear polyacetals there are suited both homo- and copolymerizates of the precedingly defined cyclic acetals and also linear condensates of aliphatic or cycloaliphatic α,ω-diols, with aliphatic aldehydes or thioaldehydes are suitable as linear polyacetals. Especially preferred are the homopolymers of cyclic formals of aliphatic α,ω-diols having 2 to 8, preferably 2,3 or 4 carbon atoms, such as poly-(1,3-dioxolane), poly(1,3-dioxane) and poly(1,3-dioxepane).

The viscosity of the oxymethylene copolymerizates employed in this invention is generally at least about 30, ml/g (measured on a solution of the polymer in dimethylformamide, which contains 2% by weight of diphenylamine, at 135° C. at a concentration of 0.5 g/100ml). The crystallite melting point of the polyoxymethylene lies in the range of about 140° to about 180° C., preferably about 150° to about 170° C. The density is about 1.38 to about 1.45 g/ml, preferably about 1.40 to about 1.43 g/ml (measured according to DIN 53479; DIN is an abbreviation for German Industrial Standard).

The preferred binary or tertiary trioxanecopolymers employed in this invention are produced by polymerization of the monomers in the presence of cationic catalysts at temperatures between about 0° and about 150° C., preferably about 70° to about 140° C. (cf. for example, German published application No. 1,420,283). In this case, for example, Lewis-acids, such as borontrifluoride and antimony pentafluoride and complex compounds of Lewis-acids, preferably etherates such as borontrifluoride-diethyl-etherate and borontrifluoride-di-tert. butyletherate, are employed as catalysts. Furthermore, proton acids, such as perchloric acid, as well as salt-like compounds, for example, triphenylmethylhexafluorophosphate, acetylperchlorate, or esters of perchloric acid, such as methoxymethylperchlorate or tert. butylperchlorate, are also suitable. For the purpose of regulating molecular weight, one can employ any substance which is known to act as a chain transfer agent in the polymerization of trioxane. The polymerization takes place in bulk.

The entire disclosure of German AS No. 1,420,283 is hereby incorporated by reference and relied upon.

It is not necessary to remove the unreacted monomers contained in the crude oxymethylene copolymerizate in a separate process step if their portion does not substantially exceed about 20 weight percent. Also the inactivation of the polymerization catalyst need not be carried out in a separate process step but can take place during mixing in of the chemical stabilizers. Small amounts of water or solvent which, depending on the working up, for example through the addition of dissolved or dispersed additives get into the copolymerizate also can be removed simultaneously with the other volatile constituents.

To carry out the process of the invention the crude oxymethylene copolymerizates are treated with chemical stabilizers. Under the term chemical stabilizers there is here understood antioxidants, so-called heat stabilizers and basic materials. The antioxidants can be used alone, but preferably are used together with heat stabilizers and/or basic materials. The attainment of the goal sought by the process of the invention is also dependent in high measure on the stabilizers used. Therefore these should have at the same time a high degree of effectiveness and a volatility as low as possible.

As antioxidants there are preferably employed phenolic compounds, above all such compounds having 2 to 6 hydroxyphenyl radicals in the molecule. Especially suitable are compounds of the formula

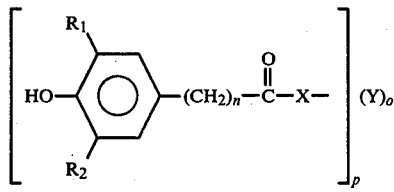

in which $R_1$ signifies a methyl radical or a branched alkyl radical having 3 to 8 carbon atoms; $R_2$ signifies a branched alkyl radical having 3 to 8 carbon atoms; X signifies an oxygen atom or the group —NH—; Y signifies a bi- to hexavalent straight-chained or branched aliphatic radical, the chain of which can be interrupted by a cyclohexylene or phenylene radical, oxygen or sulfur atoms; n signifies zero or a whole number from 1 to 6, preferably 2; o signifies the number 1; and p is a whole number from 2 to 6; or when X is —NH— o can also be zero and p can equal 2.

Compounds of the following formula are also well suited:

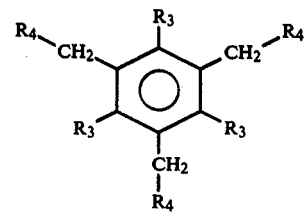

in which $R_3$ signifies an alkyl radical having 1 to 4 carbon atoms; $R_4$ signifies the radical

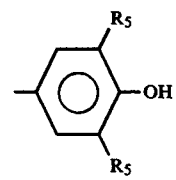

and $R_5$ signifies a branched alkyl radical having 3 to 8 carbon atoms.

Examples of the antioxidants that can be employed in this invention are ethanediol-bis-3-(3',5'-di-tert.butyl-4'-hydroxyphenyl)-propionate;2,2-dimethylpropanediol-bis-3'-(3'',5''-di-tert.butyl-4''-hydroxyphenyl)-propionate; hexanediol-bis-(3,5-di-tert.butyl-4-hydroxybenzoate); and N,N'-ethylene-bis-(3,5-di-tert.butyl-4-hydroxy-benzamide). Particularly suitable are N,N'-bis-3-(3',5'-di-tert.butyl-4'-hydroxyphenyl)-propionylhydrazine; hexanediol-bis-3-(3',5'-di-tert.butyl-4'-hydroxyphenyl)-propionate; N,N'-hexamethylene-bis-3-(3',5'-di-tert.butyl-4'-hydroxyphenyl)-propionamide; tetrakis-[methylene-3-(3',5'-di-tert.butyl-4'-hydroxyphenyl)-propionate]-methane; and 1,3,5-trimethyl-2,4,6-tris-(3',5'-di-tert.butyl-4'-hydroxyphenyl)-benzene.

Antioxidants which indeed are very effective but because of their relatively high volatility frequently disturb in the thermoplastic processing of the finished molding composition as perhaps 2,2-methylene-bis-(4-methyl-6-tert.butylphenol) can be employed in combination with the precedingly mentioned antioxidants of lower volatility. It goes without saying that it can also be advantageous for other reasons to use mixtures of two of more antioxidants. The individual components are employed in amounts in each case of about 0.001 to 2 weight percent, based on the weight of the final molding compositions. However, preferably the amount of antioxidants in the final molding composition all together is 0.1 to 1.0 weight percent.

Of the known, so-called heat stabilizers for oxymethylene copolymerizates the following are preferred:

1. Condensation products of iso- or terephthalic acid diamide, N,N'-alkylene ureas and formaldehyde. The types of condensation products and their production are described in Ricker, German Pat. No. 1,720,271. The entire disclosure of Ricker is hereby incorporated by reference. Examples of such condensation products are the condensation products of isophthalic acid diamide, ethylene urea and formaldehyde, terephthalic acid diamide, ethylene urea and formaldehyde; isophthalic acid diamide, butylene urea and formaldehyde.

2. Finely divided, cross-linked water insoluble precipitation polycondensates of melamine and formaldehyde or precipitation copolycondensates in which a part of the melamine is replaced by another material condensable with formaldehyde. This type of precipitation polycondensate and co-polycondensate and their production are specifically described in Amann, German Patent No. 2,540,207 and related U.S. Pat. No. 4,139,575. The entire disclosure of the Amann U.S. Patent is hereby incorporated by reference and relied upon. For example the precipitation polycondensates can be produced by the well-known method of first of all converting formaldehyde and melamine in a mole ratio of formaldehyde:melamine between 1.2:1 and 10:1, preferably between about 1.2:1 and about 2.0:1, in an aqueous solution or dispersion into a soluble precondensate, which then subsequently is cross-linked and precipitated.

In the finely distributed cross-linked water insoluble precipitation polycondensates up to 20 mole percent of the melamine can be replaced by one or more other substances which can be condensed with it. Examples of such substances are amidine compounds, such a dicyandiamide or 2,5-diamino-1,3,4-triazol; urea and urea derivatives, for example, ethylene urea; amides, such a malonamide or isophthalic acid diamide; aliphatic amines, such as monoethanol amine or diethanol amine; aromatic amines, such as o-toluidine, p-toluidine or p-phenylenediamine; aminoamides, such as p-aminobenzamide; phenol and sterically inhibited (blocked) phenols, such as 2,4-di-tert.-butylphenol; hydrazines and hydrazides, for example, N,N'-bis-(3',5'-di-tert.butyl-4'-hydroxyphenyl)-propionylhydrazine. The production of such mixed polycondensates takes place in the manner described using a corresponding starting mixture.

3. End group blocked carboxamide oligomers with molecular weights between 800 and 10,000. These types of oligomers and their production are described in U.S. Pat. No. 3,960,984. The entire disclosure of U.S. Pat. No. 3,960,984 is hereby incorporated by reference and relied upon.

The heat stabilizers are preferably employed in amounts of 0.05 to 2.0 weight percent especially of 0.1 to 1.0 weight percent, based on the weight of the final molding composition.

As basic materials there are used for example, amines, e.g. lauryl amine, alkali metal hydroxides, e.g. sodium hydroxide and potassium hydroxide, or basic salts especially alkali metal or alkaline earth metal salts of weak mono-or polybasic inorganic or organic acids, e.g., sodium carbonate, potassium carbonate, sodium acetate, potassium acetate, calcium acetate, calcium oxalate, sodium borate. The amount employed among other things is dependent upon the acidity of the antioxidants, heat stabilizers and other additives used as well as upon the oxymethylene copolymerizate itself, and additionally upon the amount of acid which may be formed during the carrying out of the process of the invention. It can be easily determined by simple preliminary tests. The use of too large amounts of basic materials impairs the stability and the color of the final molding composition while with the use of too small amounts the depolymerization of unstable portions does not proceed quickly enough or there can even occur a reduction in molecular weight because of acidolytic chain splitting.

The addition of chemical stabilizers can take place either during the melting or even previously in a suitable mixer. For melting the oxymethylene copolymerizate and for mixing with the chemical stabilizers and perchance other additives in principle all heated, closed mixers are suitable which are customarily used in the processing of thermoplastics. Preferred are continuously operating apparatuses, such as extruders. In many cases it can be advantageous to previously carry out a preliminary degasification in the heated mixer before, during or after the melting.

The chemical stabilizers can be added as dry powders, as concentrates ("master-batch"), as dispersions, or as solutions.

Besides the already mentioned stabilizers there can be added to the oxymethylene copolymerizates still other materials, for example UV-absorbers and light protective agents such as 2-(2'-hydroxyphenyl)-benzotriazole,
2,4-bis-(2'-hydroxyphenyl)-6-alkyl (e.g. methyl)-s-triazine,
4-hydroxybenzophenone,
1,3-bis-(2'-hydroxybenzoyl)-benzene derivatives,
oxalic acid diamide or
piperidine derivatives, particulary those described in German OS No. 1,929,928, the entire disclosure of which is hereby incorporated by reference and relied upon;
lubricants such as graphite, molybdenum disulfide, polytetrafluoroethylene, perfluorinated organic compounds, oils or waxes, processing aids, such as fatty acid esters, amides or salts, e.g. methyl stearate, stearamide, oleamide and aluminum stearate, nucleating agents such as talc, antimony trioxide, finely divided pyrogenic silicas, finely divided silicas hydrophobized by reaction on the OH groups or 2,4-diamino-6-hydroxy-s-triazine; fillers and/or reinforcing materials in powdery, fibrous, flaky or other suitable form, e.g. from metals, metal alloys, metal oxides, carbonates and silicates, such as iron, aluminum, copper, bronze, aluminum oxide, titanium dioxide, precipitated silic acid, calcium carbonate, kaolin, mica, asbestos, or from glass, carbon, organic polymers, such as cellulose, polyethers, polyamides, polyesters, polyacrylonitrile, polyvinyl alcohol, polyurethanes, butadiene polymers, copolymers or terpolymers; pigments, dyestuffs or flame protective agents.

The working in of these additional additive materials can be carried out before degassing or, especially if they are employed in relatively large amounts, even initially after the degassing of the oxymethylene copolymerizate.

After the melting the polymerizate melt is transferred into a thin layer evaporator for highly viscous media, there uniformly distributed on the wall by the wiper part of a rotating rotor, changed off for the production of new surfaces and transported further. There is installed at the discharge end of the thin layer evaporator a vacuum tight conveyor apparatus, for example a gear pump, screw rod pump or extruder pump which attends to the discharge of the melt. The discharged melt can then be further processed according to the customary methods, for example by pressing out in the form of strands which then can be comminuted to granulates before or after the solidification. To carry out the process of the invention there are suited thin layer evaporators, for example as described in Widmer, German Pat. No. 2,011,493. The entire disclosure of Widmer is hereby incorporated by reference and relied upon.

In the processing according to the process known from German AS No. 1,445,273 oxymethylene copolymerizates can be melted up in a single process step in roller mixers or extruders and degassed. The thus worked up final molding compositions, however, still contain several 100 to over 1000 ppm of residual formaldehyde.

However, if the oxymethylene copolymerizate is melted in a proper apparatus and the polymerizate melt obtained then degassed according to the process of the invention in a thin layer evaporator in a layer thickness between about 1 and about 10 mm at a pressure $P_{abs}$ of at most 150 mbar, preferably at most 60 mbar then there are obtained directly molding compositions which have only a slight content of residual formaldehyde left normally less than 100 ppm.

The characteristic data set forth in the following examples and in the comparison experiments were determined as follows:

Water Extractable and Thermally Unstable Portions 100 grams of crude oxymethylene copolymerizate were heated with a mixture of 250 ml of 1.0 weight percent aqueous ammonium carbonate solution and 250 ml of methanol for 1 hour at reflux to remove unreacted monomers and to inactivate the catalyst, after that washed with water and subsequently with methanol, filtered and dried for 5 hours at 65° C. and a pressure of $P_{abs}$=about 30 mbar. From the percent weight loss there is shown the water extractable portion. A sample of the product obtained (about 0.5 gram) was weighed in a reagent glass having a diameter of 10 mm and then introduced into a cylindrical glass apparatus with an inner diameter of 16 mm, whose outlet tube was immersed in a receiver filled with water. After rinsing with the purest nitrogen (20 minutes, about 110 ml/min) the glass apparatus was immersed in an oil bath tempered at 220° C. for 2 hours while leading through further nitrogen. The glass apparatus was then cooled down for 20 minutes in the air and test glasses reweighed. The percentage weight loss was equated with the "thermally unstable portions".

Residual Formaldehyde 10 grams of oxymethylene copolymerizate were heated with about 50 ml of distilled water with stirring and reflux cooling for 1 hour in a heating bath tempered to 100±0.5° C. Subsequently the reflux condenser was rinsed out with distilled water, the oxymethylene copolymerizate, filtered off and washed. The filtrate caught in a 100 ml measuring flask after cooling to room temperature was filled up to 100 ml with distilled water.

The determination of formaldehyde extracted took place according to a photometrical method using a reagent solution of 150 grams of ammonium acetate, p.A., (pro analysi), 3 ml of acetic acid p.A, 2 ml of freshly distilled acetylacetone p.A. and 1000 ml of distilled water. This solution is usable for at least one month.

20 ml of reagent solution and 3.0 ml of extract were filled in to a 100 ml measuring flask, made up to 100 ml with distilled water and well mixed. The formaldehyde reacts with the reagent to form the yellow colored diacetyldihydrolutidine. The extinction of the solution was measured against distilled water using a filter between 400 and 320 nm (e.g. Hg 405 nm) at a layer thickness of 2 cm. From the extinction obtained there can be read off, based on a calibration curve established by using formaldehyde solutions of known concentration, the value for the extracted formaldehyde which here is equated with the residual formaldehyde.

Intrinsic Viscosity

The intrinsic viscosity is determined on solutions in dimethyl formamide (which contains an addition of 2% of diphenylamine) at 135° C. with a concentration of 0.5 g/100 ml.

Solidification Time

There were heated to 190° C. in a differential-scanning calorimeter ("Perkin Elmer DSC2") 3.0 mg of the sample material at a rate of 40° C./min, it was held at this temperature for 5 minutes and then cooled off to 149° C. at a rate likewise of 40° C./min and held at this temperature. After reaching 149° C. there was measured the time until reaching the maximum heat flow. This time is designated the solidification time.

Melt Index (MFI)

The determination of the melt index took place according to DIN 53735 at 190° C. and 2.16 kp load.

In the following examples when not otherwise indicated the concentration data is given in weight percent.

The process can comprise, consist essentially of or consist of the steps set forth and the compositions employed can comprise, consist essentially of or consist of the materials set forth.

EXAMPLE 1

An oxymethylene copolymerizate with 3.1 mole percent of 1,3-dioxepane units and an intrinsic viscosity of 61 ml/g which still contained 7.8% of water extractable and 3.0% of thermally unstable components was mixed with the following additives based on the extracted oxymethylene copolymerizate without unstable components:

0.4% isophthalic acid diamide-N,N'-ethylene-urea-formaldehyde-condensation product (produced according to Ricker, German Pat. No. 1,720,271, Example 1), 0.4% of N,N'-hexamethylene-bis-3-(3',5'-di-tert.butyl-4-hydroxyphenyl)-propionamide and 0.1% of aqueous 0.2 percent sodium carbonate solution. This mixture was melted in a single screw extruder (screw diameter 60 mm, length 28 diameters) and conveyed through a heated piece of tubing into an evacuated thin layer (or film) evaporator having a diameter of 150 mm ("film-truder" HS 0050 of Luwa AG). The degassed product was carried out of the thin layer evaporator by means of a gear pump and pressed through an extrusion die. The round strands about 2 mm thick were led through a water bath and subsequently comminuted in a roller granulator. The vapors or gases sucked out of the thin layer evaporator were partially absorbed by water sprayed in, partially condensed in an after connected condenser.

Operating data of the extruder:
Barrel temperatures: 150°/190°/190°/215° C.,
Screw speed: 50 rpm.
Test Conditions in the Degassing

| | |
|---|---|
| Heating jacket temperature of film extruder | 205° C. |
| Rotor speed | 190 rpm. |
| P$_{abs}$ | 47 mbar |
| Melt temperature at the inlet | 195° C. |
| Melt temperature in the discharge part (before the nozzle) | 236° C. |
| Rate of shear | 1500s$^{-1}$ |
| Average residence time in the treating zone | 70 seconds |
| Average layer thickness | 1.5 mm |

There was produced an output of 53 kg/h of granulate. The product had the following characteristics data: MFI 8.8 (g/10 min), 67 ppm residual formaldehyde, weight loss in heating for two hours to 220° C. under nitrogen 0.01%, under air 1.6%.

EXAMPLE 2

The experiment was carried out at a pressure P$_{abs}$ of 135 mbar, otherwise, however, exactly as described in Example 1. The granulate obtained had a residual formaldehyde content of 133 pm.

EXAMPLE 3

The experimental conditions given in Example 1 were changed in the following points:
Operation data of the extruder:
Barrel temperatures: 165°/190°/180°/200° C.,
Screw speed: 75 rpm.
Conditions of the Experiment in the Degassing

| | |
|---|---|
| Heating jacket temperature of the film extruder | 221° C. |
| Rotor speed | 120 rpm |
| P$_{abs}$ | 47 mbar |
| Melt temperature at the inlet | 200° C. |
| Melt temperature in the discharge portion (before the nozzle) | 228° C. |
| Rate of Shear | 950s$^{-1}$ |
| Average residence time in the treatment zone | 64 seconds |
| Average layer thickness | 2.5 mm. |

There was produced a discharge of 80 kg/h of granulate. The product still contained 103 ppm of residual formaldehyde, lost in heating for 2 hours at 220° C. under nitrogen 0.01% of its weight and under air 1.5% of its weight.

EXAMPLE 4

The experiment was carried out with the same extruder adjustment as stated in Example 3.

| | |
|---|---|
| Heating jacket temperature of the film extruder | 221° C. |
| Rotor speed | 190 rpm |
| P$_{abs}$ | 47 mbar |
| Melt temperature at the inlet | 200° C. |
| Melt temperature in the discharge portion (before the nozzle) | 238° C. |
| Rate of shear | 1500s$^{-1}$ |
| Average residence time in the treatment zone | 57 seconds |
| Average layer thickness | 2.0 mm |

There was obtained a product with only 68 ppm of residual formaldehyde.

EXAMPLE 5

The experimental conditions stated in Example 1 were changed as follows:

Operating data of the extruder:
Screw speed: 100 rpm
Experimental Conditions in the Degassing

| | |
|---|---|
| Heating jacket temperature of the film extruder | 253° C. |
| Rotor speed | 120 rpm |
| P$_{abs}$ | 27 mbar |
| Rate of shear | 950s$^{-1}$ |
| Average residence time | 55 seconds |
| Average layer thickness | 2.5 mm |

There was produced an extrudate of 109 kg/h of granulate. The product still contained 44 ppm of residual formaldehyde, with a two hour heating to 220° C. under nitrogen it lost 0.07% of its weight, under air 1.2% of its weight.

EXPERIMENT 6

The experimental conditions set forth in Example 1 were changed as follows:
Operating data of the extruder:
Barrel temperatures: 170°/190°/180°/200° C.
Screw speed: 125 rpm
Experimental Conditions in the Degassing

| | |
|---|---|
| Heating jacket temperature | 255° C. |
| Rotor speed | 120 rpm |
| Rate of shear | 950s$^{-1}$ |
| Average residence time | 50 seconds |
| Average layer thickness | 3.0 mm |

There was produced an extrudate of 133 kg/h of granulate. The product had the following properties: residual formaldehyde 70 ppm, loss of weight with two hours heating to 220° C. under nitrogen 0.06%, under air 1.1%.

EXAMPLE 7

An oxymethylene copolymerizate having 3.2 mole percent 1,3-dioxepane units and an intrinsic viscosity of 87 (ml/g) which still contained 4.2% of water extractable and 2.4% of thermally unstable components was mixed with the following additives based on the extracted oxymethylene copolymerizate without the unstable components:

0.4% of a melamine-formaldehyde copolymerizate (produced according to Amann U.S. Pat. No. 4,139,575, Example 9 and also Example 9 of German Pat. No. 2,540,207), 0.4% of N,N'-hexamethylene-bis-3-(3',5'-ditert.butyl-4'-hydroxyphenyl) propionamide and 0.3% of aqueous 0.1 percent sodium carbonate solution. The mixture was melted as set forth in Example 1, degassed and granulated.

Operating Conditions of the Extruder:
Barrel temperatures: 150°/190°/190°/215° C.
Screw speed: 71 rpm.
Experimental Conditions in the Degassing

| | |
|---|---|
| Heating jacket temperature | 255° C. |
| Rotor speed | 120 rpm |
| P$_{abs}$ | 47 mbar |
| Melt temperature at the inlet | 216° C. |
| Melt temperature in the discharge portion (before the nozzle) | 242° C. |
| Rate of shear | 950s$^{-1}$ |
| Average residence time | 68 seconds |
| Average layer thickness | 2.5 mm |

There was produced an extrudate of 82 kg/h of granulate.

The product had the following properties: MFI 2.5 (g/10 min.), residual formaldehyde 69 ppm, loss of weight after heating at 220° C. for 2 hours under nitrogen 0.05%, under air 0.9%, solidification time 29 seconds.

COMPARATIVE EXPERIMENT

For this experiment there was employed the crude polymer treated with same stabilizers as described in Example 1. The product was melted in a twin screw degassing extruder (ZSK-57 of the Werner & Pfleiderer Company, screw diameter 57 mm, length 38 diameters, 2 degassing zones) and degassed, extruded in the form of strands and then granulated.

Operating data of the extruder:
Barrel temperatures: 200°/252°/256°/220°/190° C.
Screw speed: 220 rpm
$P_{abs}$ Zone I 100 mbar, Zone II 27 mbar.

There was produced an extrudate of 41 kg/h of granulate. The product had the following properties: MFI 2.6 (g/10 min), residual formaldehyde 234 ppm, loss of weight after heating at 220° C. for 2 hours under nitrogen 0.06%, under air 1.4%, solidification time 46 seconds.

The entire disclosure of German priority application P 28 40 679.3-44 is hereby incorporated by reference.

What is claimed is:

1. A process for the production of oxymethylene copolymerizate molding compositions having a small portion of residual formaldehyde comprising heating the polymerizate melt treated with chemical stabilizers in an apparatus in which there are continuously presented new polymerizate surfaces under reduced pressure, said heating being carried out in a thin layer evaporator for highly viscous media at an average residence time of 30 to 120 seconds, at a rate of shear between 500 and 2000s$^{-1}$ and at a pressure $P_{abs}$ of not over 150 mbar and drawing off the escaping gases countercurrent to the polymerizate melt.

2. The process of claim 1 wherein the heating of the polymerizate melt is carried out at a pressure $P_{abs}$ of not over 60 mbar.

3. The process of claim 1 wherein the oxymethylene copolymerizate has a crystalline melting point of about 140° C. to about 180° C., a density of about 1.38 to about 1.45 g/ml and a viscosity of at least about 30 ml/g when measured at 135° C. with a solution of 0.5 g oxymethylene copolymerizate in 100 ml dimethyl formamide containing 2% by weight diphenylamine, said chemical stabilizer being present in an amount of 0.001 to about 2% by weight based on the weight of said oxymethylene copolymerizate.

4. The process of claim 3 wherein the oxymethylene copolymerizate is a copolymer of trioxane and 0.01 to 20% of a cyclic ether having 3 to 5 ring members, cyclic acetals having 5 to 11 ring members and linear polyacetals.

5. The process of claim 4 wherein the comonomer has the formula

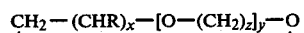

where R is a hydrogen atom, an alkyl group having 1 to 6 carbon atoms and 1 to 3 halogen atoms, an alkoxymethyl group having 2 to 6 carbon atoms, a phenyl group or a phenoxymethyl group, x is a whole number from 1 to 3 when y is 0; y is a whole number from 1 to 3 when x is zero and z is 2; z is a whole number from 3 to 6 when x is zero and y is 1.

* * * * *